(12) United States Patent
Luo et al.

(10) Patent No.: US 12,606,029 B2
(45) Date of Patent: Apr. 21, 2026

(54) SYSTEMS FOR MOLDING METAL SHEET INTO INVERTER FOR IMPROVING EMC PERFORMANCE

(71) Applicant: BorgWarner US Technologies LLC, Wilmington, DE (US)

(72) Inventors: Hongjun Luo, Singapore (SG); Jun Jie How, Singapore (SG); Kin Yean Chow, Singapore (SG); Edmund Lim, Singapore (SG); Yew Ming Chong, Singapore (SG)

(73) Assignee: BorgWarner US Technologies LLC, Wilmington, DE (US)

( * ) Notice: Subject to any disclaimer, the term of this patent is extended or adjusted under 35 U.S.C. 154(b) by 322 days.

(21) Appl. No.: 18/494,347

(22) Filed: Oct. 25, 2023

(65) Prior Publication Data

US 2025/0083532 A1 Mar. 13, 2025

Related U.S. Application Data

(60) Provisional application No. 63/582,179, filed on Sep. 12, 2023.

(51) Int. Cl.
*H02M 1/44* (2007.01)
*B60L 15/00* (2006.01)
*H02K 11/01* (2016.01)

(52) U.S. Cl.
CPC ........ *B60L 15/007* (2013.01); *H02K 11/0141* (2020.08); *H02M 1/44* (2013.01); *B60L 2210/40* (2013.01); *B60L 2220/50* (2013.01)

(58) Field of Classification Search
CPC .............. H05K 7/1432; H05K 9/0084; H05K 7/14322; H02M 1/44; B60L 15/007;
(Continued)

(56) References Cited

U.S. PATENT DOCUMENTS 5,055,070 A 10/1991 Plegge et al.
6,409,542 B1 * 6/2002 Ivey, Jr. ............. H01R 13/6592
439/607.58
(Continued)

FOREIGN PATENT DOCUMENTS

DE 102022201614 * 8/2023 ............. H01R 13/52
JP 6458875 B 1/2019
JP 7265564 B2 4/2023

OTHER PUBLICATIONS

Translation of DE102022201614. (Year: 2023).*
Translation (Year: 2023).*

*Primary Examiner* — Burton S Mullins
(74) *Attorney, Agent, or Firm* — Joshua M. Haines; Bookoff McAndrews, PLLC

(57) ABSTRACT

An inverter may include a housing having a body and a protruding rim extending from the body, wherein the protruding rim surrounds a cavity that extends through to the body. An inverter may include one or more electrical receptacles, wherein the one or more electrical receptacles are disposed within the cavity such that a portion of at least one of the one or more electrical receptacles extends above the protruding rim. An inverter may include a metal sheet, wherein the metal sheet is molded to an inner surface of the protruding rim such that the protruding rim extends past the metal sheet, and wherein the metal sheet circumferentially surrounds the cavity.

8 Claims, 6 Drawing Sheets

(58) Field of Classification Search
CPC ............. B60L 2210/40; B60L 2220/50; H02K
11/0141; H02K 11/33; H01R 2201/26;
H01F 27/36
See application file for complete search history.

(56) References Cited

U.S. PATENT DOCUMENTS

| | | | | |
|---|---|---|---|---|
| 7,393,218 | B1 | 7/2008 | Pavlovic et al. | |
| 8,052,472 | B2 * | 11/2011 | Uchida .............. | H01R 13/6591 |
| | | | | 439/108 |
| 9,099,814 | B2 | 8/2015 | Snader et al. | |
| 9,343,941 | B2 * | 5/2016 | Okamoto ........... | H02K 11/0094 |
| 10,136,536 | B2 * | 11/2018 | Naono ................ | H01R 13/533 |
| 10,211,564 | B2 * | 2/2019 | Miyazawa ........... | H01R 9/2491 |
| 10,477,717 | B2 * | 11/2019 | Hasija .................... | H05K 5/069 |
| 10,637,197 | B2 * | 4/2020 | Oka ........................ | H01F 17/06 |
| 12,027,809 | B2 * | 7/2024 | Giambrone ........ | H05K 7/14322 |
| 2014/0106619 | A1 * | 4/2014 | Okamoto ........... | H01R 13/6596 |
| | | | | 439/607.58 |
| 2015/0061422 | A1 * | 3/2015 | Nagao .................. | H02M 7/003 |
| | | | | 310/68 D |
| 2016/0020679 | A1 | 1/2016 | Nakayama | |
| 2019/0320549 | A1 | 10/2019 | Song et al. | |
| 2021/0152098 | A1 | 5/2021 | Seike et al. | |
| 2022/0183175 | A1 | 6/2022 | Bremicker et al. | |
| 2022/0190675 | A1 * | 6/2022 | Uneme ................. | H02K 5/225 |
| 2022/0274476 | A1 * | 9/2022 | Yamashita ............. | B60K 17/16 |

* cited by examiner

100

108

106

110

104

102

112

206

SYSTEMS FOR MOLDING METAL SHEET INTO INVERTER FOR IMPROVING EMC PERFORMANCE

CROSS-REFERENCE TO RELATED APPLICATION(S)

This application claims the benefit of priority to U.S. Provisional Patent Application No. 63/582,179, filed Sep. 12, 2023, the entirety of which is incorporated by reference herein.

TECHNICAL FIELD

Various embodiments of the present disclosure relate generally to systems for an inverter in an electric vehicle, and more particularly, to systems for improving electromagnetic compatibility (EMC) performance.

INTRODUCTION

A variety of electromagnetic compatibility (EMC) and/or electromagnetic interference (EMI) tests are conducted during the manufacturing process of an electric vehicle (EV) to ensure the EV meets industry standards. EVs are designed in such a way that the EV is safe for use and passes the EMC/EMI testing. Improving durability and reducing vibration are also important to consider in EV systems. However, current designs for the AC retainer section of a traction inverter not only provide much lower EMC performance than expected and, consequently, fail EMC/EMI tests, but also involve an assembly process to attempt to overcome the low EMC performance.

The present disclosure is directed to overcoming one or more of these above referenced challenges.

SUMMARY OF THE DISCLOSURE

In some aspects, the techniques described herein relate to an inverter including: a housing having a body and a protruding rim extending from the body, wherein the protruding rim surrounds a cavity that extends through to the body; one or more electrical receptacles, wherein the one or more electrical receptacles are disposed within the cavity such that a portion of at least one of the one or more electrical receptacles extends above the protruding rim; and a metal sheet, wherein the metal sheet is molded to an inner surface of the protruding rim such that the protruding rim extends past the metal sheet, and wherein the metal sheet circumferentially surrounds the cavity.

In some aspects, the techniques described herein relate to an inverter, wherein the metal sheet includes a grounding tab protruding from an opening of the body.

In some aspects, the techniques described herein relate to an inverter, wherein the metal sheet is made of a metal with magnetic properties.

In some aspects, the techniques described herein relate to an inverter, wherein an environmental seal fully covers an outer surface and a top surface of the protruding rim, and wherein the environmental seal partially covers a top portion of the inner surface of the protruding rim.

In some aspects, the techniques described herein relate to an inverter, wherein the environmental seal is made of a dielectric material.

In some aspects, the techniques described herein relate to an inverter, wherein the environmental seal is made of silicone.

In some aspects, the techniques described herein relate to a motor assembly for an electric vehicle including: a main housing having an internal volume configured to enclose an inverter, wherein a side of the main housing includes a first opening; a second housing having an internal volume configured to enclose an electric motor, the second housing positioned adjacent and exterior to the main housing, wherein a side of the second housing includes a second opening, wherein the main housing is coupled to the second housing such that the side of the main housing that includes the first opening faces the side of the second housing that includes the second opening, wherein the first opening and the second opening are in communication with one another; and an inverter including: an inverter housing having a body and a protruding rim extending from the body, wherein the protruding rim surrounds a cavity that extends through to the body; and a metal sheet, wherein the metal sheet is molded to an inner surface of the protruding rim such that the protruding rim extends past the metal sheet, and wherein the metal sheet circumferentially surrounds the cavity, wherein the inverter is partially housed in the main housing such that a surface of the body is in contact with an inner surface of the side of the main housing that includes the first opening, and wherein the protruding rim at least partially extends through the first opening and the second opening.

In some aspects, the techniques described herein relate to a motor assembly, wherein the coupling between the main housing and the second housing creates a gap between an exterior surface of the side of the main housing that includes the first opening and an exterior surface of the side of the second housing that includes the second opening.

In some aspects, the techniques described herein relate to a motor assembly, wherein the metal sheet extends from inside of the main housing to at least past the gap.

In some aspects, the techniques described herein relate to a motor assembly, wherein the metal sheet is configured to shield the gap from EMI leakage.

In some aspects, the techniques described herein relate to a motor assembly, wherein the metal sheet includes a metal tab protruding from an opening of the body.

In some aspects, the techniques described herein relate to a motor assembly, wherein the metal sheet includes metal with magnetic properties.

In some aspects, the techniques described herein relate to a motor assembly, wherein an environmental seal fully covers an outer surface and a top surface of the protruding rim, and wherein the environmental seal partially covers a top portion of an inner surface of the protruding rim.

In some aspects, the techniques described herein relate to a motor assembly, wherein the environmental seal is made of a dielectric material.

In some aspects, the techniques described herein relate to a motor assembly, wherein the environmental seal is made of silicone.

In some aspects, the techniques described herein relate to a vehicle including: a drive motor; a plurality of wheels; a battery; and an inverter including: a housing having a body and a protruding rim extending from the body, wherein the protruding rim surrounds a cavity that extends through to the body; one or more electrical receptacles, wherein the one or more electrical receptacles are disposed within the cavity such that a portion of at least one of the one or more electrical receptacles extends above the protruding rim; and a metal sheet, wherein the metal sheet is molded to an inner surface of the protruding rim such that the protruding rim extends past the metal sheet, and wherein the metal sheet circumferentially surrounds the cavity.

In some aspects, the techniques described herein relate to a vehicle, wherein the metal sheet includes a metal tab protruding from an opening of the body.

In some aspects, the techniques described herein relate to a vehicle, wherein the metal sheet is made of metal with magnetic properties.

In some aspects, the techniques described herein relate to a vehicle, wherein an environmental seal fully covers an outer surface and a top surface of the protruding rim, and wherein the environmental seal partially covers a top portion of the inner surface of the protruding rim.

In some aspects, the techniques described herein relate to a vehicle, wherein the environmental seal is made of a dielectric material.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Since an inverter, such as a traction inverter, converts a direct current (DC) input into an alternating current (AC) output, there can be a relatively large amount of EMI generated. Specifically, areas that are poorly shielded, such as electrical connections inserted in plastic receptacles, can produce enough EMI to severely degrade EMC performance. Existing designs to assemble the inverter to the electric motor for EVs create a gap between two separate housings. Embodiments of the present disclosure have better EMC performance than systems without an EMI shield provided for this gap. Current solutions add to the parts list and assembly process and are both inefficient and cost ineffective. One or more embodiments of the present disclosure may include a metal sheet configured to shield the gap, thus reducing EMI and improving EMC performance.

Embodiments of the present disclosure may reduce the complexity of the manufacturing process and/or reduce part count by directly molding a metal sheet into the inverter. One or more embodiments may solve EMI leakage caused by the gap between the housings so an EMI seal is no longer required for the main housing the inverter is positioned in and may also include an environmental dielectric seal partially covering an opening in the inverter to protect it from foreign debris. One or more embodiments may improve vibration reliability. Thus, embodiments of this disclosure may provide low-cost manufacturing assemblies for an inverter connecting to an electric motor that solves one or more of the aforementioned problems with current assemblies.

Figure 1A:
FIG. 1A depicts an exemplary system infrastructure for a vehicle including a motor assembly, according to one or more embodiments.

FIG. 1A depicts an exemplary system infrastructure for a vehicle including a traction inverter, according to one or more embodiments.

Electric vehicle 100 may include motor assembly 102, connectors 104, drive motor 106, wheels 108, and battery 110. Motor assembly 102 may further include electric motor 112 and inverter 206. Connectors 104 may connect inverter 206 and battery 110. Inverter 206 may include components to receive electrical power from an external source and output electrical power to charge battery 110 of electric vehicle 100. Inverter 206 may convert DC power from battery 110 in electric vehicle 100 to AC power, to power the drive motor 106 and wheels 108 of electric vehicle 100, for example, but the embodiments are not limited thereto. Inverter 206 may be bidirectional, and may convert DC power to AC power, or convert AC power to DC power, such as during regenerative braking, for example. Inverter 206 may be a single-phase inverter, or a multi-phase inverter, such as a three-phase inverter, for example.

Figure 1B:
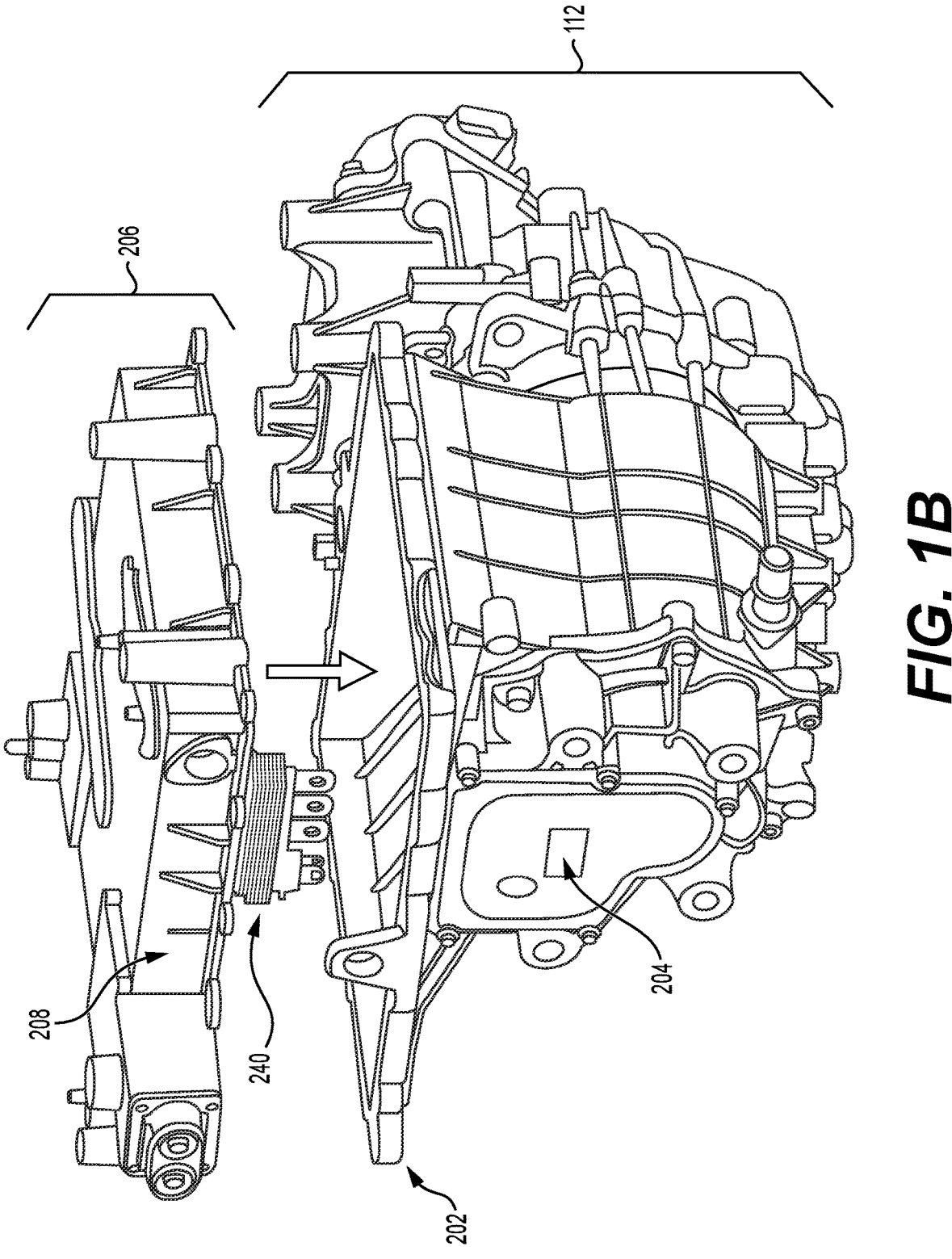
FIG. 1B depicts an exemplary motor assembly for a vehicle, according to one or more embodiments.

FIG. 1B depicts an exemplary motor assembly for a vehicle, according to one or more embodiments.

Motor assembly 102 may include main housing 202, secondary housing 204, inverter 206, AC retainer 240 and electric motor 112. The AC retainer 240 is the section of the inverter 206 that carries high-voltage and low-voltage (HV/LV) electrical connectors and connects the inverter 206 to the electric motor 112. The body 218 of AC retainer 240 may be mounted to inverter housing 208. Inverter 206 may include both inverter housing 208 and AC retainer 240. Inverter housing 208 may be coupled to main housing 202. More specifically, main housing 202 includes an internal volume that may be configured to, either partially or fully, enclose the inverter 206. Electric motor 112 may be coupled to main housing 202 and/or secondary housing 204 such that main housing 202 and secondary housing 204 house all of the components of electric motor 112. Main housing 202 and secondary housing 204 may be adjacent to one another, as shown in FIG. 1B. Secondary housing 204 includes an internal volume that may be configured to enclose a portion of the electric motor 112. As will be explained in more detail below, main housing 202 may be coupled to secondary housing 204 so that a portion of inverter 206 extends through into secondary housing 204. More specifically, a portion of AC retainer 240 may extend through into the secondary housing 204.

Figure 2:
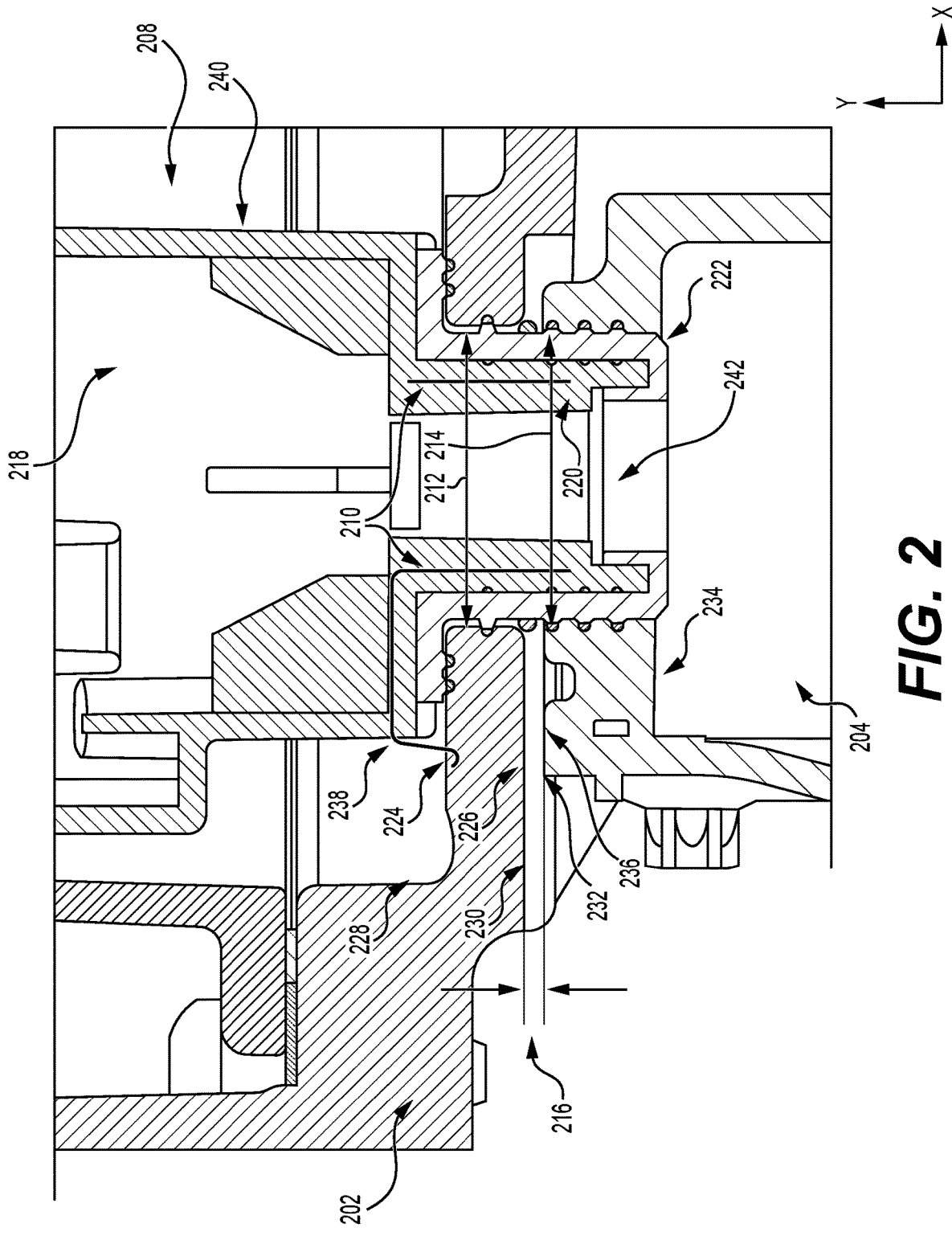
FIG. 2 depicts a cross-sectional view of an exemplary motor assembly including the main housing, the secondary housing, the inverter housing, and the AC retainer, according to one or more embodiments.

FIG. 2 shows a motor assembly according to one or more embodiments. FIG. 2 additionally includes an XY coordinate reference plane; the reference plane is solely for exemplary purposes to assist in the detailed description below and is not meant to be limiting.

AC retainer 240 may include a body 218 (as mentioned above) portion and a protruding rim 220 portion that surrounds a cavity 242. Metal sheet 210 may be within both body 218 and protruding rim 220. Main housing 202 may be coupled to a secondary housing 204. First wall 226 of main housing 202 coupled to secondary housing 204 may include a first opening 212 that extends through a portion of the first wall 226. The first wall 226 extends in a plane with the first opening 212 also in the plane. A channel is created by the first opening 212 along an axis perpendicular to the plane the first wall 226 and first opening 212 are located in. According to one or more embodiments, main housing 202 may also house the inverter 206 and/or couple to the inverter housing 208.

Secondary housing 204 may house the electric motor 112 (not shown in FIG. 2). Similarly to main housing 202, secondary housing 204 may include second opening 214 that extends through a portion of one side, such as second wall 236, of the secondary housing 204. Secondary housing 204 may be coupled to main housing 202 in such a way that first opening 212 and second opening 214 are in communication with one another. The second wall 236 extends in a plane with the second opening 214 also in the plane. A channel is created by the second opening 214 along an axis perpendicular to the plane the second wall 236 and second opening 214 are located in. The channel extends through the inner surface 228 and outer surface 230 of the first wall 226 of main housing 202 and extends through the outer surface 232 and the inner surface 234 of the second wall 236 of secondary housing 204. Thus, the channel extends through both first wall 226 of main housing 202 and second wall 236 of secondary housing 204. In some embodiments, the first opening 212 and second opening 214 are the same diameter. In some embodiments, the first opening 212 and second opening 214 are centered on the same y-axis, such as the axis in which the channel is created along, and are coaxial. Outer surface 230 and outer surface 232 may be facing one another. Specifically, secondary housing 204 may be coupled to main housing 202 in such a way that also creates a gap 216 between outer surface 230 and outer surface 232 of the coupled sides of the secondary housing 204 and main housing 202. Gap 216 is caused simply by the nature of the coupling between the secondary housing 204 and main housing 202. The coupled side of the main housing 202 and the coupled side of the secondary housing 204 may be the sides that include first opening 212 and second opening 214, respectively.

As shown as an exemplary embodiment in FIG. 2, first opening 212 and second opening 214 are in the x-direction while gap 216 is in the y-direction. Gap 216 may expose the first opening 212 and second opening 214 to the external environment. Gap 216 may persist throughout the entire coupling such that no part of outer surface 230 of the coupled side of main housing 202 is in contact with outer surface 232 of the coupled side of secondary housing 204. In other embodiments, gap 216 may only partially persist throughout the coupling. Gap 216 may be between 1 mm and 250 mm wide in the y-direction. In current systems, illustrative gap 216 (or an equivalent gap) causes severe EMC performance degradation as the external environment is directly exposed to high EMI. Specifically, the EMI is caused by all of the power lines, power circuits, HV connectors, and HV components inside the inverter 206 when exposed to the external environment. Embodiments of the present disclosure provide advantages when compared to current systems that contemplate adding an additional metal sheet or EMI gasket after assembly to seal the gap. These advantages have been described above and will be further described below. In one or more embodiments, inverter 206 is mainly housed in the main housing 202 while a portion extends through the first opening 212 and second opening 214.

As described above, AC retainer 240 may have a body 218 and a protruding rim 220. Body 218 may be completely housed in the interior of main housing 202. Protruding rim 220 may be partially housed in main housing 202 and secondary housing 204 as it extends through the first opening 212 and second opening 214. In some embodiments, protruding rim 220 extends fully through the first opening 212 and only partially through the second opening 214. In other embodiments, protruding rim 220 extends fully through first opening 212 and second opening 214. Environmental seal 222 may fully cover all of the outer and top surfaces of protruding rim 220 while also partially covering the inner surfaces of protruding rim 220. As can be seen in FIG. 2, environmental seal 222 may protect the cavity 242 that the protruding rim 220 surrounds, first opening 212 (and therefore the interior of main housing 202), and second opening 214 (and therefore the interior of secondary housing 204) from environmental objects, such as foreign debris. Environmental seal 222 may be designed to fill the remaining empty space in the first opening 212 and second opening 214 surrounding the protruding rim 220. In some embodiments, environmental seal 222 is made of a dielectric material. For example, environmental seal 222 may be made of silicone. Metal sheet 210 may be molded to the inside of protruding rim 220.

In some embodiments, metal sheet 210 is no more than 50 mm thick. In other embodiments, metal sheet 210 is at least 0.25 mm thick. Preferably, metal sheet 210 is between 0.1 mm and 0.5 mm thick. Even more preferably, metal sheet 210 is as thick as needed to successfully improve EMC performance while also taking into account the geometric constraints of the protruding rim 220. Thus, metal sheet 210 may be made of a metal with magnetic properties. In some embodiments, metal sheet 210 is directly molded to the inside of a portion of protruding rim 220 such that metal sheet 210 extends from main housing 202 into secondary housing 204. Thus, metal sheet 210 may fully extend past the gap 216. In this exemplary embodiment, metal sheet 210 completely shields the gap 216 from EMI leakage caused by the electrical components and connections (described above) that metal sheet 210 surrounds. Directly molding metal sheet 210 into the protruding rim 220 of the AC retainer 240 may allow for a reduced part count and/or reduced assembly process. Additionally, metal sheet 210 may improve vibration reliability as it fills in a portion of protruding rim 220.

As illustrated in FIG. 2, metal sheet 210 may include a grounding tab 224. In some embodiments, grounding tab 224 may protrude through an opening 238 in the body 218 of the AC retainer 240. In other embodiments contemplated, grounding tab 224 is disposed through an opening located elsewhere on AC retainer 240, or even an opening located on inverter housing 208. Grounding tab 224 is not meant to be limiting and may take the form of any known grounding method; for example, it is contemplated that grounding tab 224 may be a grounding strap or a grounding bus bar. Metal sheet 210 may even be directly connected to a portion of the chassis or a grounded section of the inverter housing 208 to ground the system. Grounding tab 224 may also be an entirely different method of grounding not listed but known in the art.

Figure 3:
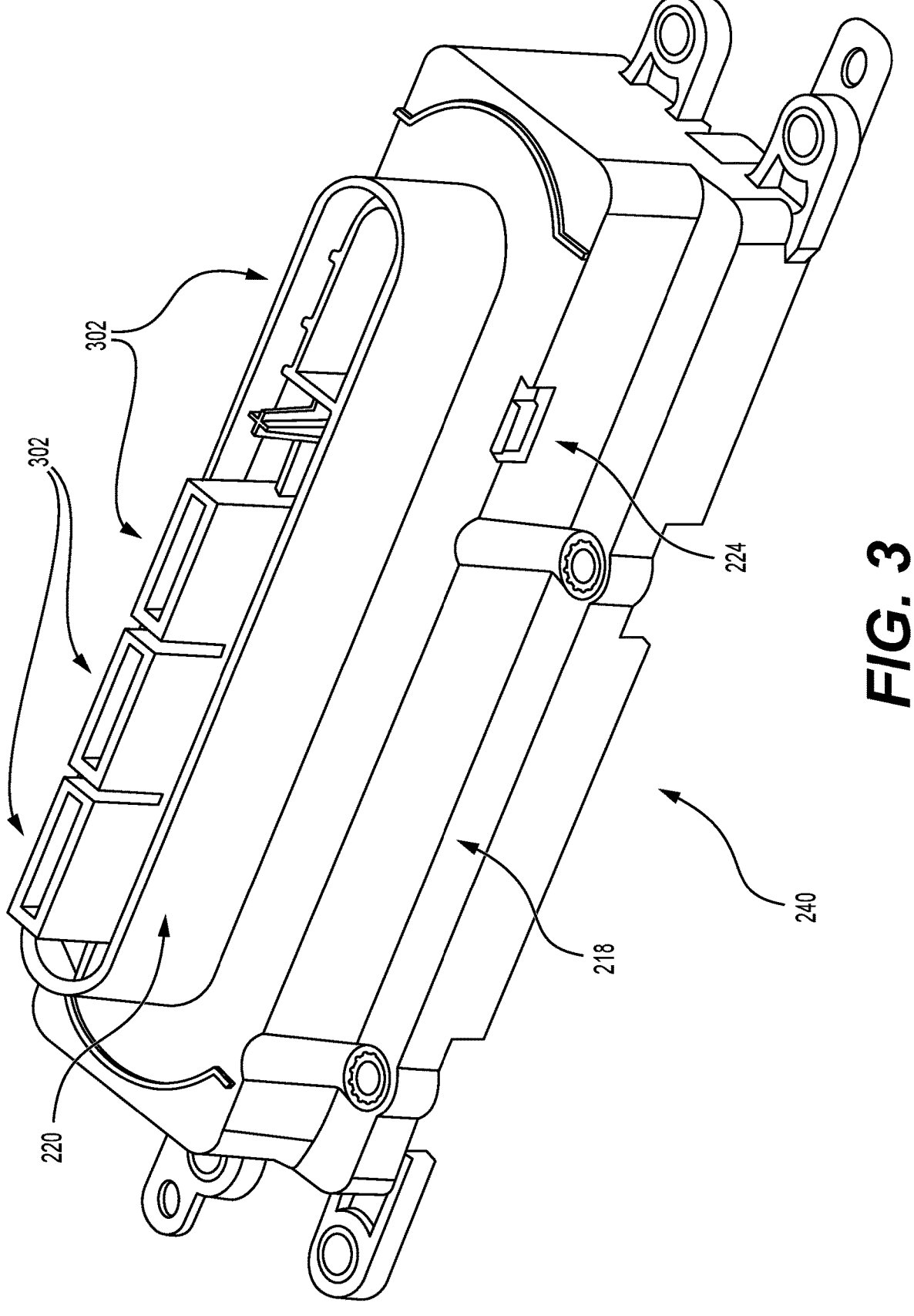
FIG. 3 depicts a perspective view of an exemplary AC retainer, according to one or more embodiments.

FIG. 3 shows an exemplary AC retainer without the rest of the motor assembly or inverter housing, according to one or more embodiments.

Electrical receptacles 302 may be disposed inside of protruding rim 220. In some embodiments, electrical receptacles 302 extend farther from the body 218 of AC retainer 240 than protruding rim 220. In other embodiments, electrical receptacles 302 extend the same distance from the body 218 of AC retainer 240 as protruding rim 220. In other embodiments, protruding rim 220 extends farther from the body 218 of AC retainer 240 than electrical receptacles 302. Additionally, the individual electrical receptacles that make up electrical receptacles 302 may extend different distances. For example, the exemplary embodiment shown by FIG. 3 has three individual electrical receptacles 302 extending the same distance from body 218 and one individual electrical receptacle 302 extending a distance from body 218 different than the other three individual electrical receptacles 302. Metal sheet 210 (not shown in FIG. 3) is disposed inside of protruding rim 220 such that it abuts an inner surface of protruding rim 220 and circumferentially surrounds the inside of protruding rim 220. Metal sheet 210 may surround a portion of electrical receptacles 302 that connect exterior electrical components to the inverter.

Figure 4:
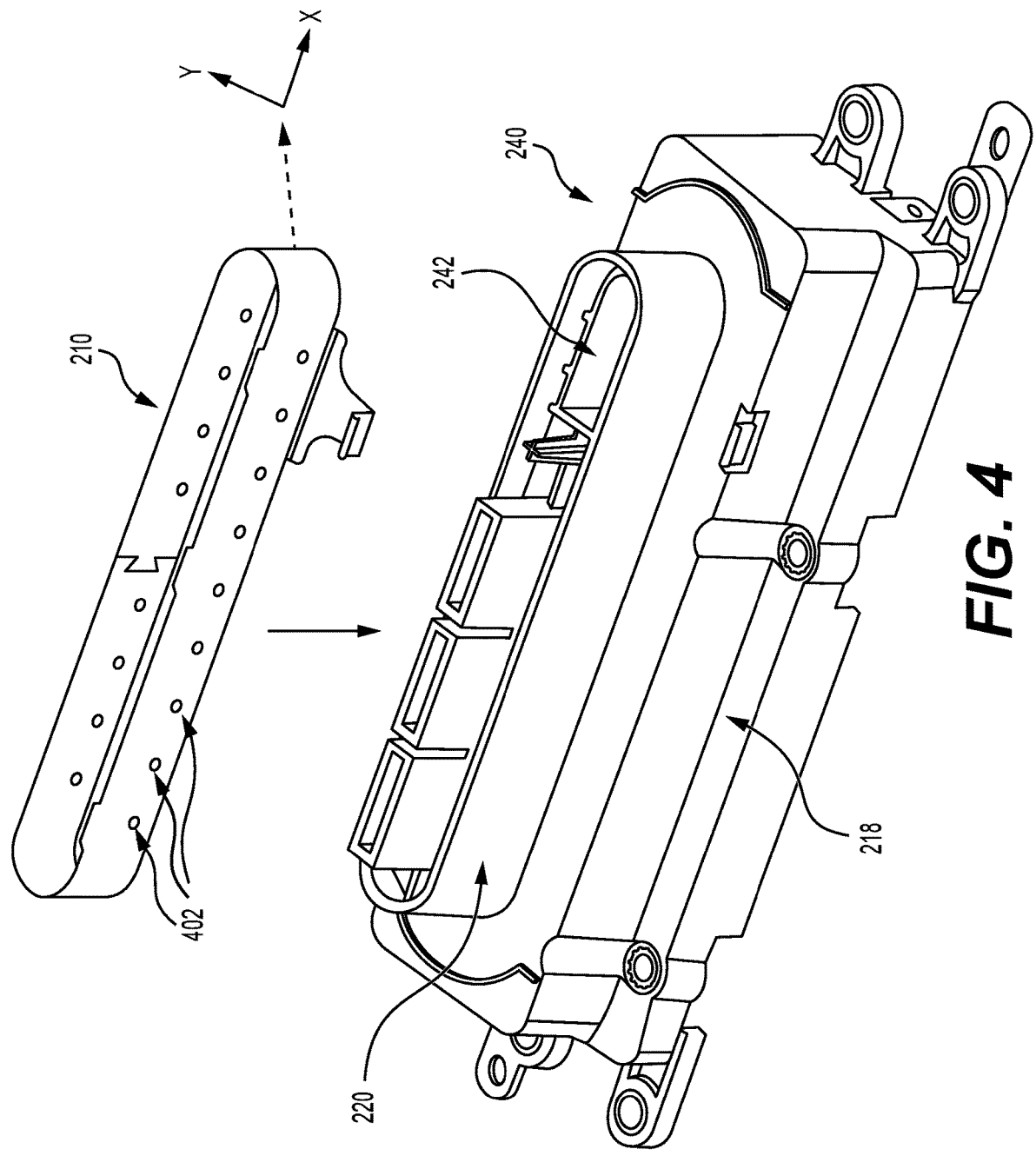
FIG. 4 depicts an exploded view of FIG. 3.

FIG. 4 shows an exploded view of the exemplary embodiment shown in FIG. 3. FIG. 4 additionally includes an XY coordinate reference plane; the reference plane is solely for exemplary purposes to assist in the detailed description below and is not meant to be limiting.

It can be readily seen that metal sheet 210 is directly molded to the inner surfaces of protruding rim 220 and surrounds the interior of protruding rim 220. The shape of metal sheet 210 may be substantially similar to the shape of protruding rim 220 since it is molded to the inner surfaces of protruding rim 220. In the exemplary embodiment shown in FIG. 4, protruding rim 220 and metal sheet 210 are a stadium shape. Metal sheet 210 may include holes 402 on the parallel, straight sides. Holes 402 may be centered at the mid-point of the metal sheet 210 in the y-direction. Holes 402 may be evenly distributed throughout the parallel, straight sides in the x-direction. This can be seen in FIG. 4. The holes 402 throughout the metal sheet 210 may be used to better secure the metal sheet during plastic injection molding.

Figure 5:
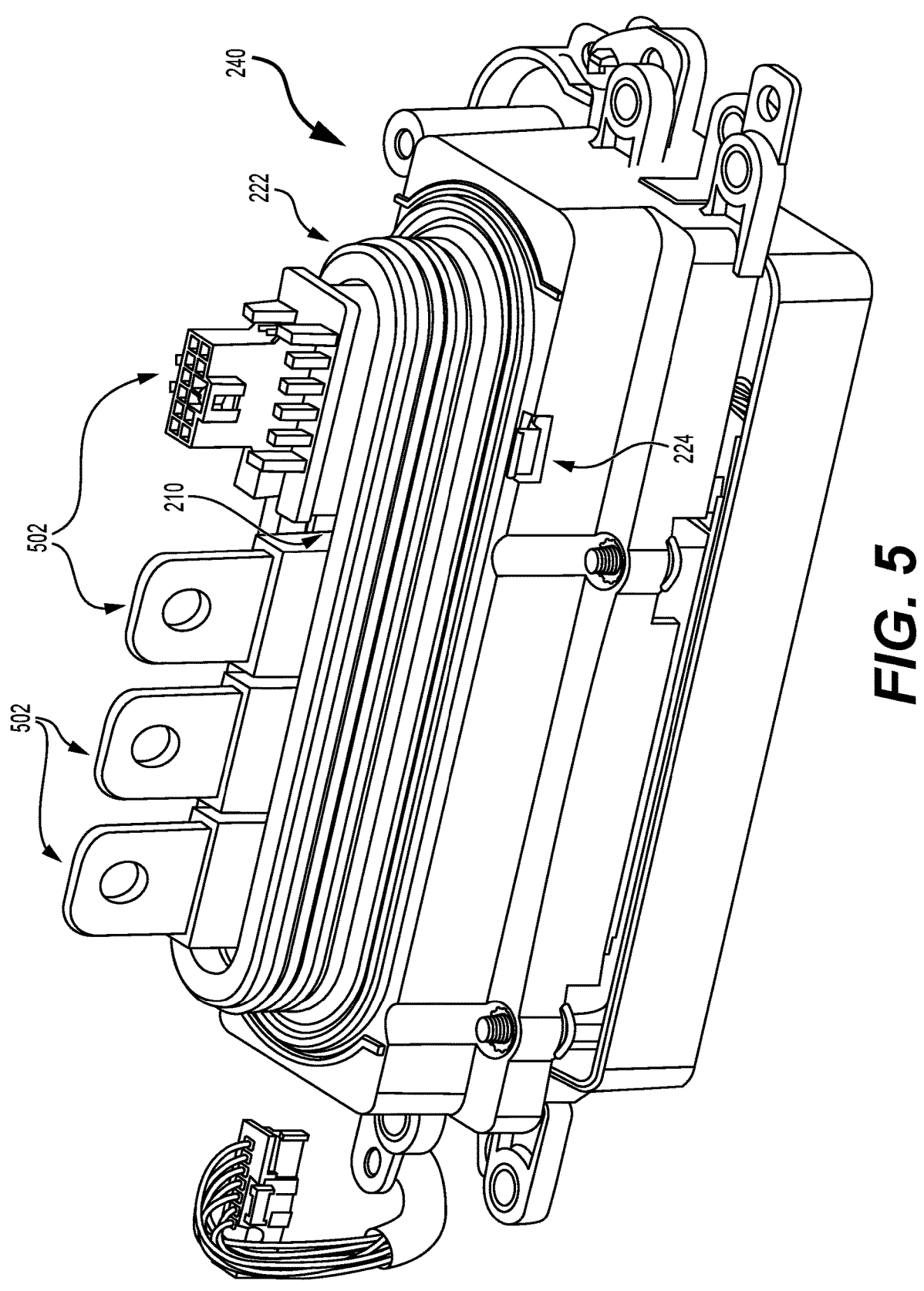
FIG. 5 depicts a perspective view of an exemplary assembled AC retainer, according to one or more embodiments.

FIG. 5 shows an exemplary assembled AC retainer, according to one or more embodiments.

Electrical connectors 502 may be at least partially disposed in the electrical receptacles 302. In some embodiments, electrical connectors 502 may include AC bus bars. In other embodiments, electrical connectors 502 may include PCB connectors. Electrical connectors 502 may be any variety, and any combination, of electrical connectors known in the art and the exemplary embodiment of FIG. 5 is not meant to be limiting. Environmental seal 222 may engulf the outer and top surfaces of protruding rim 220 while also engulfing a top portion of the inner surface of protruding rim 220. Environmental seal 222 may act as a way to reduce and/or eliminate foreign objects entering the protruding rim 220.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A motor assembly for an electric vehicle comprising:
   a main housing having an internal volume configured to enclose an inverter, wherein a side of the main housing includes a first opening;
   a second housing having an internal volume configured to enclose an electric motor, the second housing positioned adjacent and exterior to the main housing, wherein a side of the second housing includes a second opening,
   wherein the main housing is coupled to the second housing such that the side of the main housing that includes the first opening faces the side of the second housing that includes the second opening, wherein the first opening and the second opening are in communication with one another; and
   an inverter comprising:
      an inverter housing having a body and a protruding rim extending from the body, wherein the protruding rim surrounds a cavity that extends through to the body, and wherein an environmental seal fully covers an outer surface and a top surface of the protruding rim, and wherein the environmental seal partially covers a top portion of an inner surface of the protruding rim; and
      a metal sheet, wherein the metal sheet is molded to an inner surface of the protruding rim such that the protruding rim extends past the metal sheet, and
   wherein the metal sheet circumferentially surrounds the cavity, wherein the inverter is partially housed in the main housing such that a surface of the body is in contact with an inner surface of the side of the main housing that includes the first opening, and wherein the protruding rim at least partially extends through the first opening and the second opening.

2. The motor assembly of claim 1, wherein the coupling between the main housing and the second housing creates a gap between an exterior surface of the side of the main housing that includes the first opening and an exterior surface of the side of the second housing that includes the second opening.

3. The motor assembly of claim 2, wherein the metal sheet extends from inside of the main housing to at least past the gap.

4. The motor assembly of claim 3, wherein the metal sheet is configured to shield the gap from EMI leakage.

5. The motor assembly of claim 1, wherein the metal sheet comprises a metal tab protruding from an opening of the body.

6. The motor assembly of claim 1, wherein the metal sheet comprises metal with magnetic properties.

7. The motor assembly of claim 1, wherein the environmental seal is made of a dielectric material.

8. The motor assembly of claim 1, wherein the environmental seal is made of silicone.

\* \* \* \* \*